INVENTOR.
KENNETH L. MILES
BY Fulwider, Patton, Rieber Lee, and Utecht
ATTORNEYS

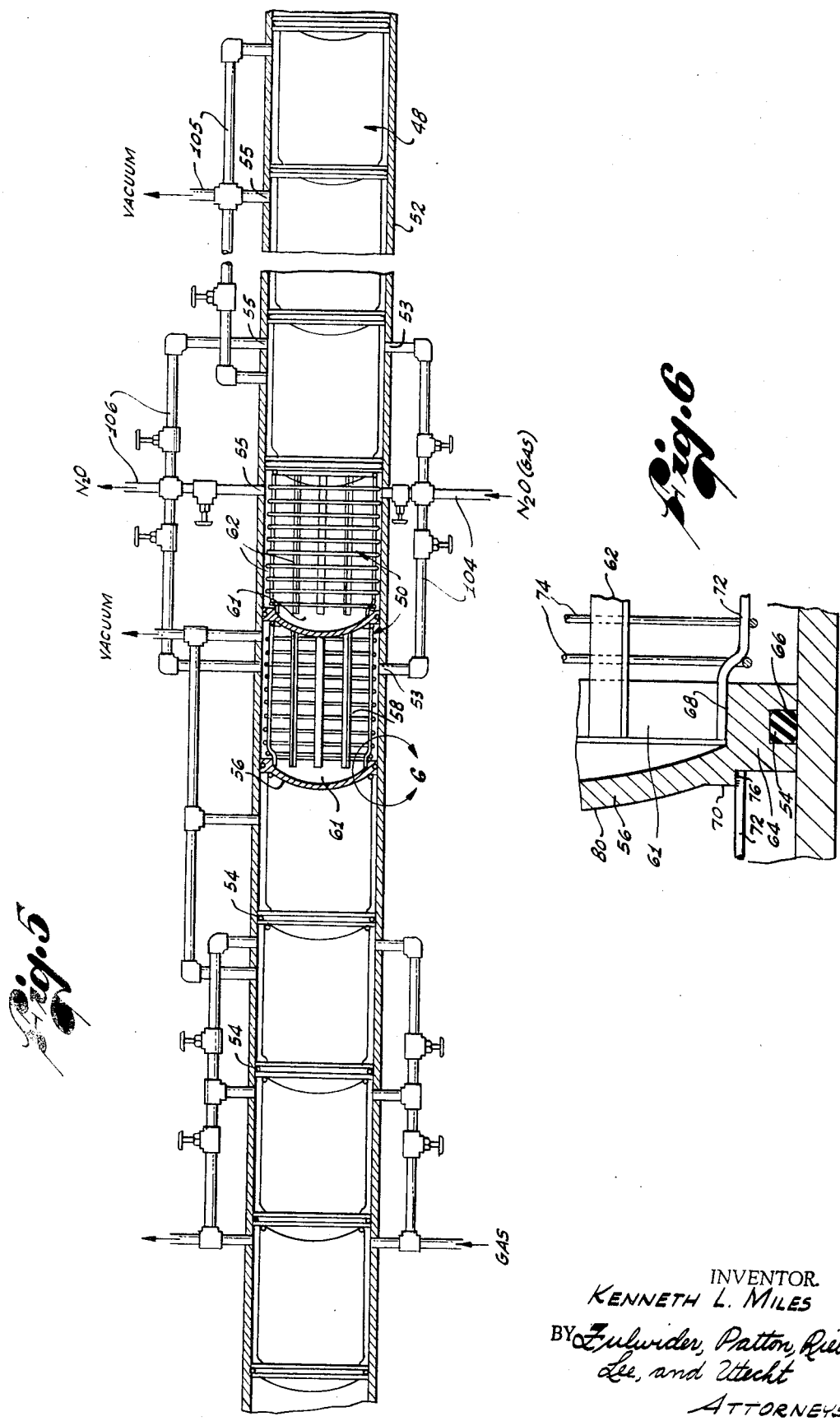

United States Patent Office 3,511,671
Patented May 12, 1970

3,511,671
PROCESS FOR DEHYDRATION OF FOODSTUFF
Kenneth L. Miles, 22919 Leonora Drive,
Woodland Hills, Calif. 91364
Filed Sept. 20, 1965, Ser. No. 488,645
Int. Cl. A23b 7/02
U.S. Cl. 99—199                              10 Claims

ABSTRACT OF THE DISCLOSURE

Foodstuff which has been partially dried is contacted with pressurized nitrous oxide to remove additional moisture. The contact step is followed by further drying. Thereafter an additional contacting step with pressurized nitrous oxide may be employed.

---

Figure 1:
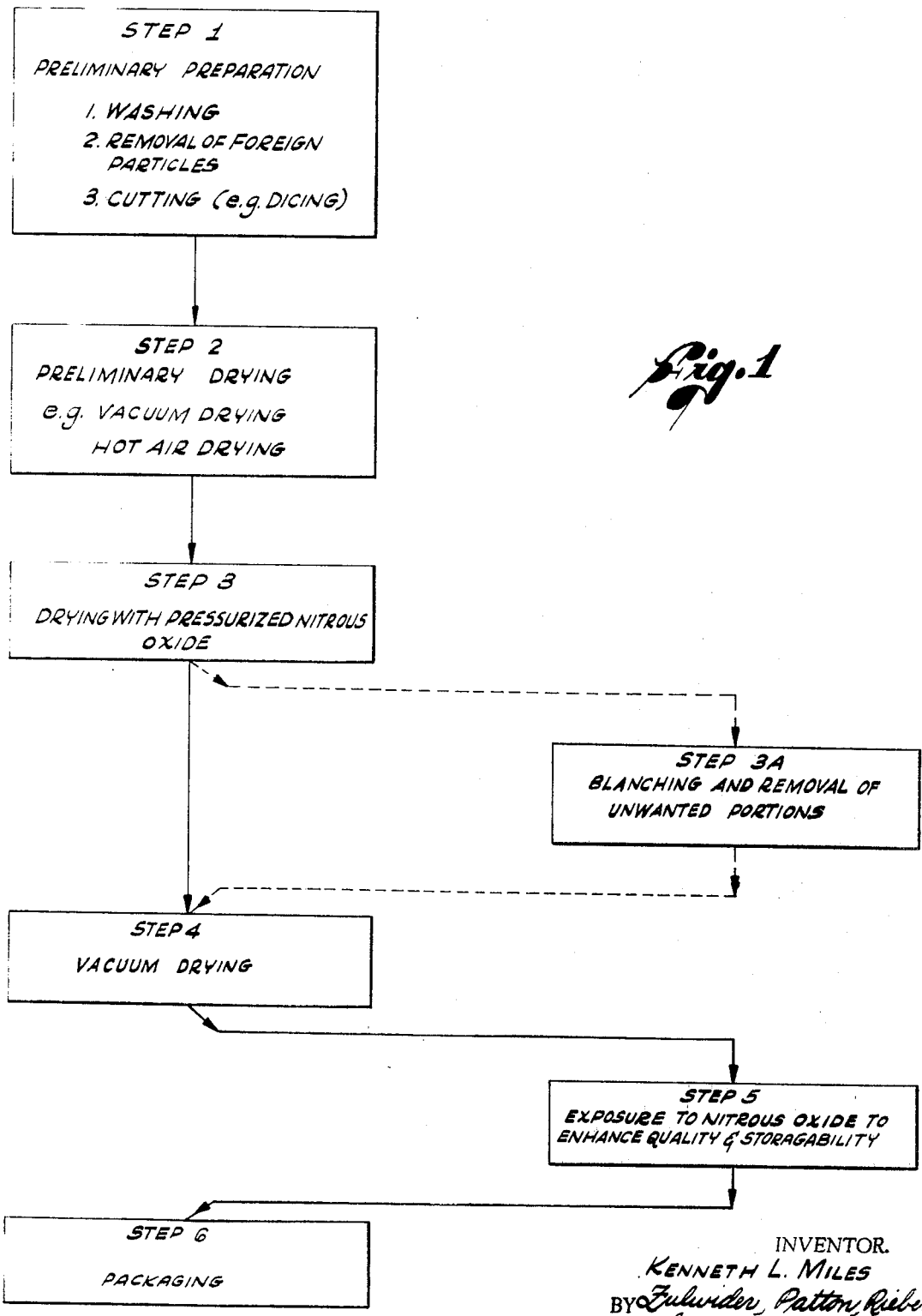

This invention relates to the dehydration of organic substances. More specifically, it relates to dehydration of such organic substances in the presence of nitrous oxide to produce dehydrated substances which, upon subsequent hydration, have much improved appearance, flavor and storage characteristics as compared to the prior art.

Although this invention may be used to dehydrate many types of organic substances such as fruit, vegetables, meat, fish, herbs, spices and wood, the following description of this invention will concern itself with various foods because of their greater economic importance.

Heretofore, dehydration of foodstuffs was performed by a variety of processes. These processes often required such operations as blanching, freezing, enzyme inhibition using various basic or acidic solutions or providing synthetic atmospheres using costly gas mixtures. Although many of these processes produced a dehydrated food of marketable quality, such dehydrated foods often exhibited poor rehydration, cellular weakness and lacked true flavor and color in addition to being highly susceptible to deterioration upon prolonged storage.

In view of the aforementioned deficiencies in the prior art, it is a major object of this invention to dehydrate food such that subsequent hydration will produce a food having much improved retention of its natural characteristics.

Another object of this invention is to dehydrate foods while retaining substantially all of their food values, minerals, vitamins and flavor and preserving their natural appearance.

It is still another object of this invention to provide a process for dehydrating foods which will produce dehydrated foods in which substantially all bacterial activity is eliminated thereby greatly extending the storage life of such foods.

It is yet another object of this invention to provide a process for dehydrating foods which will minimize the need for food additives.

A further object of this invention is to produce dehydrated foods having shapes, textures and consistencies which greatly facilitate packaging for marketing and shipping purposes.

It is a still further object to reduce the cost of quality dehydration.

It is yet another object to provide basic equipment for carrying out a process for dehydrating foods which are readily adaptable to compact, portable equipment for in situ food processing.

It is an additional object to provide equipment for the practice of a process suitable for semi-continuous or continuous operation.

Other objects and advantages will become apparent by reference to the following description of this invention.

In general, my process consists in intimately contacting foods with nitrous oxide gas. Nitrous oxide gas has the property of displacing moisture from within foods and appears to associate with foods in some unexplained manner. Contact of the nitrous oxide gas with a food is continued until the moisture contained in the food has decreased to the desired level. Nitrous oxide gas may be used alone or in combination with other gases. Since nitrous oxide gas is relatively expensive, it may be preferred to use a gas comprising nitrous oxide together with a gas such as air, nitrogen or other inert gas. [1] However, use of other gases in combination with nitrous oxide requires longer contact of the dehydrating gas with the food than when nitrous oxide is used alone. On balance, it is usually preferred to use a combination of gases containing a majority of nitrous oxide.

Furthermore, it is preferable for economic reasons to combine nitrous oxide dehydration steps with standard dehydration steps such as, for example, vacuum drying. Thus, for example, my process may comprise in combination a preliminary drying step using vacuum drying and a final drying step using nitrous oxide gas or my process may comprise four steps where the aforesaid vacuum drying and nitrous oxide drying steps are alternated or my process may comprise a series of cycles wherein each cycle comprises a standard drying step and a nitrous oxide drying step. The latter process is particularly useful where sensitive foodstuff such as grapes is being treated. The cycling process introduces nitrous oxide into the food after each small quantity of moisture is removed by standard techniques thereby maintaining the cellular structure.

Although my nitrous oxide dehydration process is generally described herein as a combination of dehydration and nitrous oxide contact steps, a variation of my process includes merely intimately contacting the foodstuff with nitrous oxide gas without the elimination of any substantial amount of moisture. Sufficient nitrous oxide is retained in intimate association with the foodstuff to greatly extend the storage life of the foodstuff. This method is particularly useful where it is desired to store foodstuff containing low amounts of water, for example, fruit, butter, prunes and jams.

Nitrous oxide is used in my invention because experimentation indicates that it associates with the food in an apparently unique manner, that is, it appears to form a fairly stable bond with the dehydrated food. Such unique association enables the nitrous oxide to stabilize the cellular structure of the food when further dehydration takes place and appears to prevent enzymatic activity over long periods of time. The unique association of nitrous oxide with food is not precluded by the use of a combination of other gases, as previously described. Since the other gases apparently do not form this unique bond, they are either replaced by nitrous oxide gas or are removed when a vacuum is applied to the food.

Nitrous oxide is safe to use in the small quantities taken up by the food being treated. Not only are small amounts of nitrous oxide uniquely associated with the foods, but most of such nitrous oxide readily dissolves in the relatively large quantities of water used without chemical reaction, and therefore evaporates upon rehydration of the food.

Referring now to FIG. 1, the presently preferred method of performing my process is shown as comprising a sequential combination of the following steps: a preliminary preparation of the foodstuff including washing and trimming in a standard fashion (Step 1); a prelim-

---

[1] Hereinafter, "inert gas" will be used to denote any gas which is non-toxic to humans in the quantities which might be retained by the foodstuff upon rehydration.

inary drying step (Step 2); a second drying step in the presence of a nitrous oxide (Step 3); a third drying step (Step 4); a final treatment with nitrous oxide (Step 5); and packaging for market or shipping (Step 6). As will become evident from the more detailed description below, various modifications and additions may be made at different steps in the above general outline.

The first step comprising the preliminary preparation of the foodstuff is a conventional step, that is, it is fairly standard in food processing. This step involves the sub-steps of washing, eliminating undesirable parts and cutting. Depending upon the particular foodstuff to be cleaned and perhaps on economic factors, washing may be carried out by using water, steam or a suitable organic solvent. Following the washing period, all undesirable parts such as stems, seeds and blemishes are removed either manually or by mechanical means. Next, the foodstuff is cut into any desired shape appropriate for marketing or shipping. After the latter sub-step, the foodstuff material is conveyed into a dehydration vessel preparatory to proceeding with the second step.

As previously noted, a preliminary drying step not involving the use of nitrous oxide, is preferred for economic reasons. Therefore, the preliminary drying step is preferably carried out by a conventional method such as, for example, vacuum drying, hot air drying or sun drying. The equipment used at this point will, of course, depend upon the particular drying method chosen. In turn, the drying method used will depend to some extent on the type of foodstuff or material being dried. Vacuum drying is the preferred method as it can be used for all materials, whereas hot air and sun drying have limited application.

Should the preferred vacuum drying method be used, it has been found that a vacuum range of approximately 12 inches to 29.9 inches of mercury should be used. In this vacuum range the temperature in the vacuum chamber may be kept near the boiling point of water measured at the operating pressure. The temperature should not be allowed to go below the freezing point of water and preferably should be kept appreciably about such temperature. Best results have been achieved at approximately 28 inches of mercury vacuum (1.92 inches of mercury absolute pressure) with a temperature close to the boiling point of water at that pressure.

Whichever of the above noted drying methods is used, it is important to carefully control the moisture loss to prevent overdrying. As herein used, overdrying refers to that excess drying in the preliminary drying step which produces loss of nutritional elements from the foodstuff and/or damage to the cellular structure. The maximum amount of moisture removed in this step depends to a major extent on the particular food being processed. It has been found that the maximum amount to be removed should fall within the range of from approximately 4% to approximately 45%[2] of the total initial moisture content. It is the usual practice to remove as much moisture in the preliminary drying step as possible without reaching the overdrying point. It has been found that removal of too little moisture in this step reduces the effectiveness of the nitrous oxide dehydration step (Step 3).

By way of example, for best results with fruits and leafy vegetables, the moisture removed falls between about 30% and about 45% of the initial moisture content. There is no actual lower limit since, as mentioned, the amount of moisture to be removed prior to nitrous oxide exposure is dictated by economic considerations.

As will be further described in the apparatus portion of this description, the moisture loss may be controlled by several methods including directly weighing the moisture after condensing it by suitable means or by indirectly weighing the lost moisture. The latter method comprises weighing the food material and determining the moisture loss from the changes in the food material weight. These methods of moisture-loss control can be employed in each of the dehydrating steps.

The third step involves further drying the foodstuff or other material in an atmosphere of nitrous oxide. If nitrous oxide is used in combination with another gas, it is preferable that the nitrous oxide comprise a major portion of the gas mixture for economic reasons, i.e., to reduce the time required to form the nitrous oxide-dehydrated foodstuff bond. This step is of major importance since it is believed that the nitrous oxide, in addition to removing some of the contained moisture and inhibiting ezymatic oxidation, is retained by and supports the natural cellular structure of the food. A dehydrated product is thus produced which, upon subsequent hydration, has much improved appearance, structure and flavor.

If the preliminary drying is performed under vacuum, virtually all the oxygen will have been removed from the dehydration chamber and the nitrous oxide employed in Step 3 can be introduced immediately upon closing off the vacuum line to the dehydration chamber. Should another drying method have been used in the preliminary drying step, there will be air present which should be removed before the introduction of nitrous oxide. This is best accomplished by drawing a vacuum.

After the air and/or other gases are substantially removed, pressurized nitrous oxide is allowed into the dehydration chamber.

The nitrous oxide in the dehydration chamber is normally kept under a pressure of approximately 7 to 21 p.s.i.g. (pounds per square inch gauge). For most foodstuff a pressure of 10 to 12 p.s.i.g. is preferred. However, for citrus fruits and tomatoes it has been found that a pressure of 16 to 18 p.s.i.g. produces the best results. Although these pressure ranges are not critical, superior results will be obtained by pressurizing the nitrous oxide within the noted pressure ranges. Since it is of prime importance for the nitrous oxide to intimately contact the cells and components of the foodstuff, the higher pressures, noted herein, are believed to aid the penetration of the nitrous oxide into the remote areas of the foodstuff. However, this penetration will occur at lower pressures, provided sufficient time or mechanical mixing is allowed. Pressures as low or lower than ambient may prove to be economical in some cases.

While being subjected to the pressurized nitrous oxide atmosphere, the foodstuff material should be maintained at approximately the same temperature as it was in preliminary drying Step 2. The nitrous oxide is circulated through or past the food material until an additional 10 to 15% of the original moisture content has been removed. These limits should be closely approximated to produce a superior foodstuff product.

If the end product of the foodstuff processing is to be a concentrated puree, an additional Step 3a may be introduced between Steps 3 and 4, as shown in FIG. 1. In this step, food can be taken from the dehydration chamber and processed in an ambient atmosphere using, for example, a conventional brush screener, to remove such food parts as peels, seeds and stems. This step may be necessary because the preliminary preparation step did not remove all such foodstuff parts or because the removal of these foodstuff parts was omitted from Step 1. Upon completion of the screening, the screened mass is ready for further drying by the procedure of Step 4.

Step 4 is a third drying step and is carried out using, for example, a conventional vacuum dryer. The dehydration is continued until the desired moisture content is reached. This is usually between 6 and 8% of the final dehydrated food weight; however, moisture contents of less than 1% may be attained.

Although a vacuum will remove additional moisture and other gases in the food structure, it does not appear to remove any of the "combined" nitrous oxide, that is, that nitrous oxide apparently forming a unique bond with ---
[2] All percentages herein given are weight percent.

the foodstuff. Thus, the nitrous oxide will continue to support the foodstuff structure as the dehydration is continued in Step 4.

In some cases the process may be terminated at the end of Step 4. However, in order to maintain the natural color and flavor of the foodstuff and to practically eliminate enzymatic activity for long periods of time, further exposure of the food to nitrous oxide is made, as shown schematically by Step 5 of FIG. 1. Low pressure nitrous oxide, at from approximately 1.5 to 6.0 p.s.i.g., is passed through the foodstuff for several minutes. Although the nitrous oxide could remain in contact with the food indefinitely, it has been found that a 2 to 4 minute nitrous oxide gas flow or exposure at 2 to 3 p.s.i.g. produces optimum results. In addition to producing a dehydrated food which has exceptionally long storage life, this step is also useful for producing a food consistency which is especially suitable for grinding, i.e., for making into a flour.

Following Step 5, the foodstuff may be put into any formed desired for selling purposes such as, for example, a powder, a meal or granules. The foodstuff may then be packaged in any of the conventional ways of packing.

When it is desired to produce a pre-cooked or blanched end product, such cooking may occur either before preliminary drying Step 2, during nitrous oxide drying Step 3, or during or after Step 3a. Should cooking occur after Step 3, it would be necessary to repeat the dehydration steps, starting with preliminary drying Step 2. Cooking before Step 2 is accomplished by conventional methods. After cooking in this manner, the foodstuff is subjected to drying Step 2; the remaining steps are performed as outlined above.

As noted above, cooking may be carried out in nitrous oxide Step 3. This is preferably accomplished by heating the nitrous oxide to the cooking temperature of the foodstuff being dehydrated. The steps following Step 3 of this invention are then performed as previously described. In addition to cooking the food, the heated nitrous oxide also accelerates the removal of moisture due to its greater absorptive capacity. Where only the accelerated rate of moisture removal is desired, the nitrous oxide may be heated from approximately 100° F. to the evaporation temperature of the moisture corresponding to the dehydration chamber pressure.

As described, the process of this invention may be used to dehydrate fruit such as apples, pears and bananas; citrus fruit such as grapefruit, lemons and oranges; berries such as blackberries, cranberries and gooseberries; leafy vegetables such as asparagus, cabbage, celery and spinach; vine-grown vegetables such as beans, peppers and tomatoes; root vegetables such as beets, carrots and potatoes; and miscellaneous products such as meat, fish, spices, wood, coffee and tobacco.

Additionally, slight modifications of the process of this invention will permit this invention to be used to preserve semi-moist foods such as jams, jellies, fruit butters and partially dried fruit. These foods may be preserved by the process of this invention without using the conventional preservatives. After treatment to remove the normal amount of water as in preliminary drying Step 2, these foods can be subjected to nitrous oxide as described in nitrous oxide drying Step. 3. If desired, a negligible amount of moisture may be removed by this step, or the percent of moisture removed may equal the percentages given previously in describing nitrous oxide Step 3. The nitrous oxide atmosphere must be retained until the nitrous oxide has come into intimate contact with the individual cell and foodstuff components. Mechanical mixing can be used to expedite this contacting operation. If further dehydration is required, it may be done as in Step 3 or Step 4. When semi-moist foods are thus treated, the nitrous oxide acts to better preserve these foods on exposure to air.

Nitrous oxide may also be intimately admixed with fatty foodstuff for the purpose of preserving such foodstuff. The tendency of these fatty foodstuffs to turn rancid on exposure to air is greatly reduced by the absorbed nitrous oxide. The nitrous oxide may be introduced into these fatty foodstuffs, for example, by subjecting the particular foodstuffs to nitrous oxide under a positive pressure while maintaining such foodstuff in a liquid, or semi-liquid state. Mechanical mixing can also be used to introduced the nitrous oxide into the fatty foodstuffs.

The previously-described steps of this invention may be performed either as a batch or as a continuous process. In the batch process, the foodstuff is placed in a vacuum-pressure vessel having associated with it requisite heaters and vacuum and nitrous oxide lines. Each of the dehydrating steps of this process is then performed in the sequence previously described. In the continuous process, the dehydrating vessel of the batch process is replaced by a series of separate chambers containing foodstuff and capable of being moved to various locations such that, at each location, the foodstuff is subjected to one of the steps of this invention in numerically ascending order. These two process methods will be further described in connection with the following apparatus description.

Figure 2:
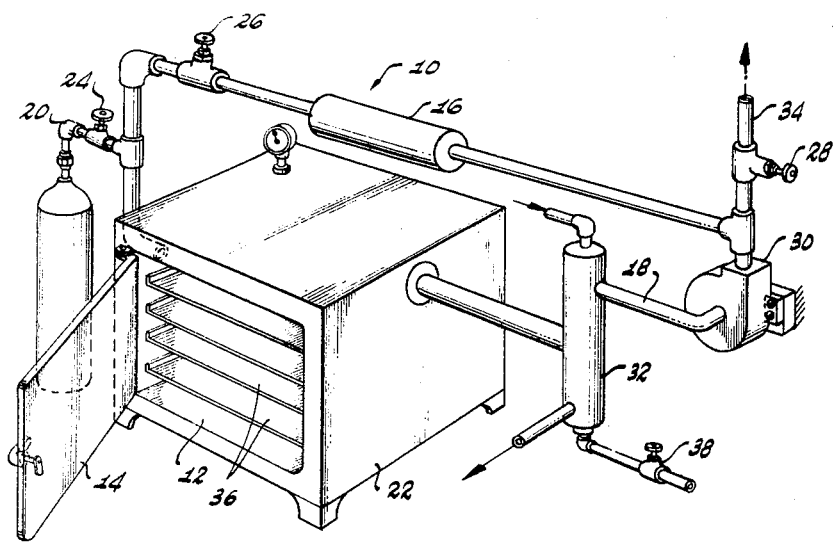

As previously noted, the batch process required only a single dehydration vessel capable of withstanding high vacuums and moderate positive pressures. Turning now to FIG. 2, it will be seen that numeral 10 denotes such a dehydration vessel with certain accessories. For ease of insertion and removal of foodstuff, the vessel 22 should have a large opening 12 into which a door 14 may sealingly fit to seal the vessel from air when a vacuum exists in the vessel and to seal the vessel from loss of nitrous oxide when the latter exists in the vessel under positive pressure.

The dehydration vessel 10 has associated with it an auxiliary heater 16, a vacuum line 18 and a nitrous oxide delivery line 20. The primary heater (not shown) may be an integral part of the walls of the vessel 22, for example, steam or resistance heating, or it may be completely separate from the vessel 22 construction as, for example, radiant heaters mounted within or without such vessel.

The lines 18 and 20 are capable of withstanding a high vacuum and moderate positive pressure, respectively. Additionally, each line has a valve 24, 26, 28 associated with it so that each line can be completely sealed off when not in use.

Conventional vacuum systems may be used in conjunction with the vessel 22, such as, for example, mechanical vacuum pumps 30 and steam ejectors. Additionally, conventional gas bottles may be used as a source of nitrous oxide. To conserve nitrous oxide, a circulating system, containing a condenser 32 to remove moisture and the heater 16 may be used. If this is not done the nitrous oxide may be vented to the atmosphere through an exhaust 34 containing the valve 28.

To facilitate control of the moisture loss at each step of this invention, lost moisture may be collected in the condenser 32 attached to the vacuum line 18 and weighed directly as moisture loss or a scale (not shown) may be used within the vessel 22 to weigh the foodtuff and thereby determine the moisture loss from the decreasing foodstuff weight.

When used in conjunction with the process steps of my invention, the dehydration equipment 10 is made ready by closing the nitrous oxide inlet valves 24 and 26, opening valve 28 and starting the condenser 32. The foodstuff, after being prepared as previously described in Step 1, is then placed on the trays 36 and the door 14 is closed. The vacuum pump 30 is started and a vacuum of approximately 28 inches of mercury is drawn on the dehydration vessel 22. Heat is applied to the foodstuff by radiant heaters (not shown) to maintain the food temperature at approximately the boiling point of water at 28 inches of mercury vacuum. This vacuum is maintained until approximately 4–45% of the original moisture content of the foodstuff has been removed. Determination of this end-point is made by drawing off the condensate through the valve 38 and weighing such condensate (scale not shown).

At the conclusion of the preliminary drying Step 2 of my process, valve 28 is closed and valves 24 and 26 are opened. This procedure permits use of the vacuum pump 30 as a re-circulating pump and reduces the cost of nitrous oxide. The pressure of the nitrous oxide in the dehydration vessel 22 is adjusted at valve 24 until the desired pressure is reached, as hereinbefore described. The heater 16 may be used to heat the re-circulating nitrous oxide to maintain the foodstuff at approximately the same temperature as it was subjected to in Step 2. Nitrous oxide drying Step 3 is continued until approximately an additional 15% of the original moisture content has been removed. Again, determination of this amount may be made by draining the condensate removed from the re-circulating nitrous oxide by the condenser 32, through the valve 38 and weighing it.

Drying Step 4 is begun by closing off the valves 24 and 26 and opening the exhaust valve 28. A vacuum is again drawn on the dehydration vessel 22 until the desired moisture content is reached, usually 6-8% of the original moisture content. Upon the conclusion of drying Step 4, the vacuum pump is shut off and the valve 24 is opened. This allows nitrous oxide to pass into the dehydration vessel 22. In this step (Step 5) the nitrous oxide is maintained at 2-3 p.s.i.g. for approximately 2-4 minutes.

At the conclusion of Step 5 the valve 24 is closed, valve 28 is opened to release the pressurized nitrous oxide, the door 14 is opened and the foodstuff is removed from the dehydration vessel 22. The foodstuff is then ready for packaging.

In general, the apparatus used for the continuous processing, in accordance with the herein described process, consists of a conduit containing a series of tubular baskets which are open at one end and which have a cover at the opposite end. The cover of each basket sealingly engages the interior walls of the conduit thus forming a chamber between adjacent baskets which is vacuum and pressure tight. To provide the changing environments of my food dehydration process, the conduit contains a series of spaced openings which are connected to nitrous oxide and vacuum systems. Each basket is attached to an adjacent basket and movement of the lead basket through the conduit causes each basket and therefore, each chamber, to pass by the nitrous oxide and vacuum openings. This movement thus creates alternating nitrous oxide and vacuum environments in each chamber thereby subjecting food to the successive steps of my dehydration process.

Figure 3:
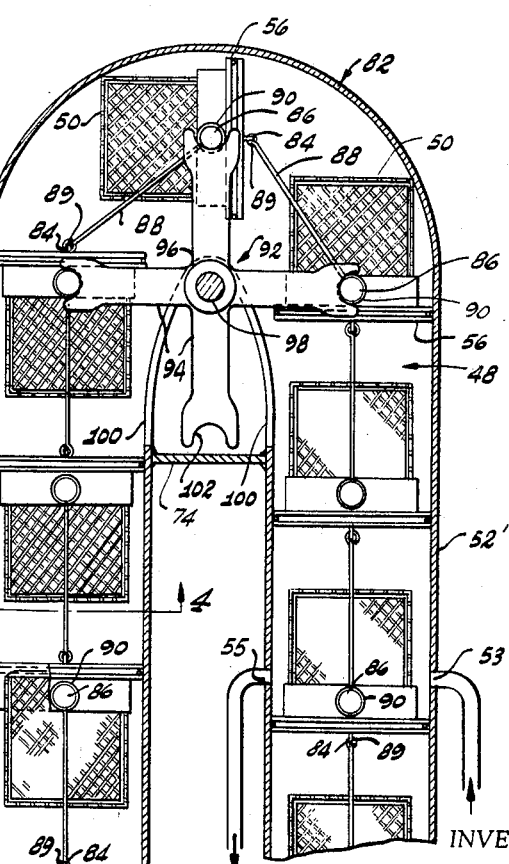

Turning now to FIG. 5, it will be seen that my invention comprises a conduit 52 having a series of inlet 53 and exhaust 55 openings, in which is carried a series of food-containing baskets 50. The conduit 52 may be straight or it may be, for example, sinusoidal as shown in FIG. 3. To maintain the food material in a warm condition, heaters (not shown) may be mounted in the walls of the conduit 52 or outside the conduit.

Carried within the conduit 52 and, in turn, carrying the food material are baskets 50. Each basket 50 comprises an end cover 56 fixedly attached to a porous tube 58 containing a series of spaced shelves 62. The end covers 56 have diameters slightly smaller than the conduit 52 and generally conform in cross-sectional shape to the conduit cross-section. To more easily withstand the positive and negative pressures involved in my dehydration process, the covers 56 are preferably parabolic in cross-sectional shape as shown in FIG. 5.

To provide a means for sealing each cover 56 with the conduit 52, each cover has a circumferential flange 64 having a peripheral groove 66 in which is located an O-ring 54, or other similar type of seal. Each O-ring 54 sealingly engages the cover 56 in which it is located and the conduit 52 thereby preventing any intermingling of atmospheres in adjacent chambers. To further aid the sealing capabilities of the O-ring, it is preferable to employ conduits 52 and covers 56 having circular cross-sections. Such a cross-section provides an annular area between cover 56 and conduit 52 having a uniform width with attendant ease of sealing and avoids having to bend the O-rings 54 around corners, thereby maximizing the O-ring life. The O-rings 54 must not only provide a seal between conduit 52 and cover 56 but they must permit the baskets 50 to move easily through the conduit. It has been found that both these requirements are adequately met when Teflon is employed as the O-ring material.

To support the foodstuff, each basket 50 contains a porous supporting tube 58 which extends laterally from one side of each cover 56 and which carries shelves 62 on which the foodstuff is placed. One end 61 of each tube 58 thus remains open to permit the food material to be placed within or removed from the baskets 50. For improved exposure of the foodstuff to the various environments of my dehydration process, the tube walls are preferably highly porous and, where the cover 56 of one basket 50 closes off the otherwise open end 61 of an adjacent basket, the tube walls must be porous. The tube 58 preferably comprises a series of longitudinal rods 72 in spaced radial relation forming the tube skeleton around which is wrapped a screen 74 to form the tube walls. The longitudinal rods 72 are permanently attached at one end 76 to the covers 56. To facilitate such attachment it is preferable to provide a radial collar 70 on one side 80 of the cover 56. The tube 58 may then be attached to the collar 70 by, for example, welding the rods 72 to the collar.

To dehydrate a maximum amount of foodstuff in each basket 50, a series of trays 62 in spaced vertical relationship is mounted in each tube 58. Such mounting may be permanent as by welding the trays 62 to the tube 58 or mounting may be accomplished simply by using the longitudinal rods 72 as support means, opposing rods in the same horizontal plane can be used to provide support at the opposing edges of each tray 62. The latter mounting method facilitates removal of the trays 62 for loading and removing foodstuff.

When a straight conduit 52 is being used, it is preferable to interconnect adjacent baskets 50 so that the cover of one basket covers the open end 61 of an adjacent basket. Such an arrangement reduces the space between baskets 50 and thereby, makes more efficient use of conduit 52 space. This method of interconnection is preferably accomplished by providing a radial surface 68 on the flange 64 (FIG. 6) having a diameter slightly larger than the diameter of the tube 58 at its open end 61. By simply pushing adjacent baskets together a slip fit is made between the tube end 61 and the cover 56 of adjacent baskets 50.

Figure 4:
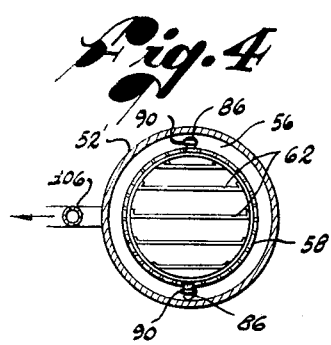

When a sinusoidal conduit 52' is being used, FIG. 4, the basket attaching means must be more flexible to negotiate the bends 82 in such conduits. A preferred method of attachment is shown in FIG. 3. On one side of each cover 56, there is attached a pair of hooks 84 in opposing marginal positions. A pair of lugs 86 is attached to the opposite side of each cover 56. Attachment is accomplished by connecting a hook 84 on one cover 56 with a lug 86 on an adjacent cover. A rod or chain 88 having curved ends 89 and 90 adapted to pass through the hooks 84 and around the lugs 86, respectively, is used as the connecting means.

To maintain the baskets 50 in orderly alignment as they pass through the bend 82, a spider 92 having a plurality of arms 94 is fixedly attached to a hub 96 and axle 98 which is fixed in position by a support rod 100. The arms 94 of the spider 92 are adapted to receive the lugs 86 individually in a groove 102 at the periphery of each arm. To ensure that each lug 86 is engaged by successive arms 94, the distance between the lugs on adjacent baskets 50 is made equal to the arcuate distance travelled by a lug as it moves around the bend 82 through a 90° angle.

In light of the preceding description, it will be seen that foodstuff, carried in each basket 50, is effectively enclosed in a chamber 48 which is pressure and vacuum tight. Each chamber 48 is formed by a segment of the conduit 52 and by covers 56 of adjacent baskets. As each basket moves through the conduit 52, it is subjected to changing environments consistent with succeeding steps in my dehydration process. Because each chamber is sealed from every other chamber, the atmosphere of each chamber 48 may differ from the atmosphere in adjacent chambers, thus permitting continuous processing.

The various environments involved in my dehydration process are provided through a series of opposing inlet 53 and exhaust 55 openings in the conduit. The inlet openings lead through lines 104 to nitrous oxide reservoirs (not shown) while the exhaust openings lead through lines 105 and 106 to vacuum units and nitrous oxide re-circulation headers, respectively, or to the atmosphere. The nitrous oxide 104 and vacuum openings 105 are spaced so that no single chamber is subjected to pressurized nitrous oxide and to a vacuum at the same time.

The process of this invention is further described by the following working examples. The foods in these examples were treated by the batch process; however, the described conditions would apply equally as well to the continuous process.

EXAMPLE I

This example indicates how vegetables may be mixed and as a mixture may be treated by the process of this invention.

Onions, carrots, celery, and potatoes were prepared by cutting off the slender roots and the undesirable tops, washed in warm water in conjunction with brushing, and then diced into approximately ½ inch squares. Green peas, separated from their pods, were then added and the vegetables mixed to an even distribution for a stew mixture. The mixture was then placed in a container which, in turn, was put into a vacuum dryer. A vacuum of about 28.5 inches of mercury was applied. Heat was applied to keep the vegetables with their moisture at about the boiling point. This was continued until approximately 35% of the moisture was removed. The vacuum system was blocked off, and nitrous oxides was introduced until the pressure was about 12 p.s.i.g. Nitrous oxide at this pressure was then passed over the vegetables until an additional 10% of the original moisture was removed. At this time about 45% of the total moisture had been removed. The vegetables were then subjected to a vacuum and dried until only 6% of the original moisture remained. To maintain a high storage capability in the vegetables, nitrous oxide was again introduced and maintained at about 3 p.s.i.g. for about 3 minutes. The mixture of vegetables was then removed from the dryer and packaged in polyethylene bags and sent to storage. Under these conditions, the stew mix remained usable for a long time. To use, the mixture was put in cool or warm water. As rehydration took place, the foodstuff resumed approximately its original shape and condition. It was then cooked in a conventional manner.

EXAMPLE II

In addition to the main steps of this invention, this example illustrates cooking in conjunction with Step 3.

Apples were washed and then sliced into four sections, put in a container and subjected to a vacuum of about 28 inches of mercury until about 35% of the moisture was removed. The drying temperature was maintained as in Example I. The apples were then subjected to nitrous oxide at about 12 p.s.i.g. The nitrous oxide was heated to about 200° F. and circulated over the apples for about 10 minutes to cook them. The nitrous oxide circulation was continued with moisture removal until an additional 10–12% of the moisture was removed. The apples were then removed and passed through a screener to remove the seeds, fibers, stem, skin, etc. The still warm screened pulp was then dried to about 6–8% moisture content in a vacuum dryer. It was then packaged in polyethylene bags for use as a baby food.

EXAMPLE III

This example illustrates the cooking procedure necessary if such cooking does not take place in association with Step. 3.

Beet greens were washed with water and then vacuum dried at 26 inches of mercury vacuum until about 30% of the moisture was lost. The greens were then cooked in a blancher for about 3 minutes with steam. The cooked greens were again subjected to a vacuum at 28 inches of mercury. Moisture was removed until the cooked greens contained about 60% of their original moisture. Then they were subjected to pressurized nitrous oxide and another 10% of the moisture was removed. Following this treatment, the greens were again vacuum dried to about 8–10% moisture content.

EXAMPLE IV

Oranges were peeled and the pulp placed in a 28 inch vacuum, as above, and approximately 40% of the moisture was removed. Nitrous oxide at 16–18 p.s.i.g. was circulated over the pulp until an additional 10% of the moisture was removed. The pulp was then put through a screener to remove the seeds and the heavy fibers. The screened pulp was dried to about 6% moisture content, and then re-treated with nitrous oxide at 2 p.s.i.g. for 3 minutes. The resulting pulp can be ground and used in cookies, pastry, and other specialty products.

I claim:
1. A process for dehydrating and preserving foodstuff comprising:
   partially drying the foodstuff until approximately 4–45 percent of the original moisture content has been removed;
   passing nitrous oxide gas at positive pressure into intimate contact with said foodstuff until about an additional 10–15 percent of the original moisture has been removed; and
   further drying said foodstuff until the desired moisture content is reached.

2. The process of claim 1 wherein the nitrous oxide gas is under a pressure of approximately 7–21 p.s.i.g.

3. A process for dehydrating and preserving foodstuff comprising:
   partially drying the foodstuff until approximately 4–45 percent of the original moisture content has been removed;
   passing nitrous oxide gas into intimate contact with said foodstuff until about an additional 10–15 percent of the original moisture has been removed;
   further drying said foodstuff until the approximate desired moisture content is reached; and
   further intimately contacting said nitrous oxide gas with said foodstuff.

4. The process of claim 3 wherein the foodstuff is selected from the group consisting of
   fruit and vegetables, said fruit and said vegetables being cut into appropriately small sections.

5. A process for dehydrating and preserving foodstuff comprising:
   partially drying the foodstuff until approximately 4–45 percent of the original moisture content has been removed;
   passing inert gas containing nitrous oxide at positive pressure into intimate contact with said foodstuff until about an additional 10–15 percent of the original moisture has been removed;

further drying said foodstuff until the approximate desired moisture content is reached; and further intimately contacting said foodstuff with said inert gas containing nitrous oxide at approximately 1.5–6.0 p.s.i.g. for approximately 2–4 minutes.

6. A process for rapidly dehydrating foodstuff, comprising:

drying the foodstuff until approximately 4–45 percent by weight of the original moisture content has been removed;

heating inert gas containing nitrous oxide to the cooking temperature of said foodstuff;

passing said inert gas, pressurized to approximately 7–21 p.s.i.g., into intimate contact with said foodstuff until approximately an additional 10–15 percent of the moisture has been removed; and further drying said foodstuff to the desired moisture content, whereby a dehydrated foodstuff requiring substantially no additional cooking is produced.

7. The process of claim 6 wherein the inert gas containing nitrous oxide is heated to the evaporation temperature of water corresponding to the pressure surrounding said foodstuff to accelerate the removal of moisture.

8. The process of claim 6 wherein the cooked dehydrated foodstuff is further intimately contacted with inert gas containing nitrous oxide, whereby a cooked food having a long storage life is produced.

9. A process for the dehydration and preservation of foodstuff selected from the group consisting of leafy vegetables, root vegetables, beans, peas, meat, fish, melons, apples, peaches, pears, grapes, pineapples, and berries, comprising:

partially drying said foodstuff until approximately 4–45 percent of the original moisture content has been removed;

passing an inert gas containing nitrous oxide at approximately 10–12 p.s.i.g. into intimate contact with said foodstuff until about an additional 10–15 percent of said original moisture has been removed;

further drying said foodstuff until the approximate desired moisture content has been reached; and further intimately contacting said inert gas containing nitrous oxide at 2–3 p.s.i.g. with said foodstuff for about 2–4 minutes.

10. The process of claim 9 wherein said foodstuff is selected from the group consisting of citrus fruit and tomatoes and wherein said inert gas containing nitrous oxide is at 16–18 p.s.i.g. during the first contacting of said nitrous oxide gas with said foodstuff.

References Cited

UNITED STATES PATENTS

| | | | |
|---|---|---|---|
| 2,385,068 | 9/1945 | Eshbaugh et al. | 99—199 X |
| 2,452,983 | 11/1948 | Birdseye | 99—204 |
| 2,541,441 | 2/1951 | Sharp et al. | 99—189 X |
| 3,335,014 | 8/1967 | Balestra | 99—150 |

A. LOUIS MONACELL, Primary Examiner

S. B. DAVIS, Assistant Examiner

U.S. Cl. X.R.

99—189, 204, 208, 209